United States Patent
Belcea

(10) Patent No.: US 8,462,043 B2
(45) Date of Patent: Jun. 11, 2013

(54) METHOD FOR DETECTING RADAR SIGNALS AFFECTED BY INTERFERENCE

(75) Inventor: John Martin Belcea, West Melbourne, FL (US)

(73) Assignees: John Belcea; Lucia Belcea

(*) Notice: Subject to any disclaimer, the term of this patent is extended or adjusted under 35 U.S.C. 154(b) by 81 days.

(21) Appl. No.: 13/158,428

(22) Filed: Jun. 12, 2011

(65) Prior Publication Data

US 2012/0313804 A1 Dec. 13, 2012

(51) Int. Cl.
*G01S 13/00* (2006.01)

(52) U.S. Cl.
USPC ............. 342/159; 342/20; 342/52; 342/162

(58) Field of Classification Search
USPC .................... 342/20, 52, 159, 162
See application file for complete search history.

(56) References Cited

U.S. PATENT DOCUMENTS

| | | | | |
|---|---|---|---|---|
| 4,209,835 | A * | 6/1980 | Guadagnolo | 708/426 |
| 7,236,790 | B2 * | 6/2007 | Tsien et al. | 455/450 |
| 7,289,057 | B2 * | 10/2007 | Meil | 342/52 |
| 2003/0107512 | A1 * | 6/2003 | McFarland et al. | 342/159 |
| 2005/0270218 | A1 * | 12/2005 | Chiodini | 342/20 |
| 2006/0028376 | A1 * | 2/2006 | Theobold et al. | 342/159 |
| 2006/0214837 | A1 * | 9/2006 | Liu et al. | 342/52 |
| 2006/0258296 | A1 * | 11/2006 | Steer et al. | 455/67.13 |
| 2007/0126622 | A1 * | 6/2007 | Nallapureddy et al. | 342/92 |
| 2010/0039308 | A1 * | 2/2010 | Bertagna | 342/20 |
| 2010/0194623 | A1 * | 8/2010 | Hansen | 342/52 |

* cited by examiner

*Primary Examiner* — John B. Sotomayor
*Assistant Examiner* — Marcus Windrich

(57) ABSTRACT

A method for detecting radar signals consisting in identification of Presumed Pulse Repetition Intervals (PPRI) by checking the set of hardware reported signals with the time-shifted set of the same signals and checking the set of PPRI with the time-shifted images of the same set of PPRI for validating radar signals. The checking of received signals and the validation of PPRI, use functions generating scores from the difference between values of characteristics of checked elements and the standard deviation of errors from calibration measurements of the same characteristics.

7 Claims, 12 Drawing Sheets

METHOD FOR DETECTING RADAR SIGNALS AFFECTED BY INTERFERENCE

FIELD OF DISCLOSURE

The method is applicable to wireless communication devices operating in U-NII networks in presence of radar signals and other interfering signals.

UTILITY OF THE METHOD

FCC and ETSI require that Unlicensed National Infrastructure (U-NII) devices operating in 5.15-5.35 GHz and 5.725-5.825 GHz have the capability of identifying signals generated by weather or military radar installations. According with current regulations, when a U-NII device detects a radar signal it should change the frequency channel for not interfering with radar operations and should not return to the same frequency for at least 30 minutes.

The licensing process for devices operating in mentioned 5 GHz bands consists in passing a set of tests defined by radio frequency regulatory entities as FCC, ETSI etc. In laboratory conditions, those tests can be easily passed as no other devices operate in the same frequency band, but a reduced size network with two U-NII devices and a generator of radar signals.

In field instead, a large variety of radio interfering signals generated by other wireless networks using the same or close frequency channels, causes two major problems Signals from unknown sources can be erroneously identified as radar signals, causing false detections Signals generated by systems collocated with U-NII networks using the same or close frequencies channels could generate signals that interleave, interfere or even obliterate radar signals impeding their correct detection Frequent false detections make impossible the operation of U-NII networks. According with legal requirements, when a U-NII device identifies a radar signal, it should not transmit on the same frequency for at least half hour therefore the wireless network should move its operation to another frequency channel. Before starting the operation in a new channel, the wireless network devices are also required to listen for at least one minute to be sure the new frequency channel is not used by another radar installation. If after one minute of silence no radar signals are identified, the network can finally start operating. Unfortunately, after moving the operation to a new frequency channel, U-NII devices may encounter false detections from other sources and should move again to another channel. It is easy to identify that in an environment with multiple networks, using various modulations and protocols, sharing the same frequency band, frequent false detections of radar signals may cause the wireless U-NII network to cease operating due to lack of available channels.

FCC and ETSI have not issued yet requirements for the identification of radar signals in presence of interfering signals from other wireless communication networks. As the number of systems and users of mentioned frequency band will increase and the detection methods will become more sophisticated, such requirements should be expected.

This method exceeds the requirements of current regulations, allowing correct identification of radar signals in presence of interfering signals from various sources, while preventing repeated false detections. It applies only to the analysis of short radar signals that are not included in the category known as Bin5 signals as described in FCC 06-96.

RELATED ART

All known radar detection algorithms, including the one presented in this application, operate at hardware and software levels.

In digital communication, the transmission of a packet of information starts with transmitting a preamble. The preamble is a predefined string of bits known by transmitter and receiver. When the receiver identifies an increase of energy level in antenna, it starts converting the received signal into a string a bits. If the received string of bits is the same as the expected preamble, it is said that the receiver has achieved synchronization to the received signal and it can continue decoding the rest of the signal. If the received string of bits is not the same as the predefined preamble, the received signal is presumed as generated by an unknown source, which could be a radar installation. The receiver makes this supposition because radar signals are transmitted using different modulations than modulation used by U-NII devices therefore the decoded beginning of a radar signal does not contain the expected preamble. For this reason, U-NII hardware (Atheros AR521x for example) reports the presence of a possible radar pulse along with information regarding the reception time, the signal duration and the strength of the received signal, every time it identifies an increase of the level of energy in antenna and the expected preamble cannot be found. Therefore, the hardware reports as possible radar pulses all received signals for which the preamble cannot be decoded correctly. It includes signals from radar installations, signals from devices using different modulations and operating in the same or close frequency channel, signals from U-NII devices operating in adjacent channels as well as from U-NII devices operating in the same channel for which the correct reception has been affected by fading or path loss and the preamble cannot be properly decoded.

The software level consists of a set of computer programs that considers the information reported by hardware regarding the received signal in context with previously received information about earlier received signals and uses it for concluding if the set of received signals contains pulses transmitted by a radar installation or not. If the presence of radar pulses in the set of signals is identified, the fact is reported to those tasks of software governing the operation of the U-NII device that control the access to frequency channels. These tasks have the role of performing needed operations intended to preventing further interference to radar operations.

This method is applicable to the software level of the system responsible only for identifying the presence of short radar signals. The term "short" will not be further used in this application, but it should be supposed that all considered signals are not long signals also known in industry as FCC Bin5 signals.

A method for detecting the presence of radar signals based on the shape of the received pulses is presented in U.S. Pat. No. 7,834,800 and U.S. Pat. No. 7,623,060 by Chhabra et al. These patents identify a received signal as radar pulse by comparing the width of the received signal with a table containing possible widths of radar pulses. As presented in ETSI EN 301 893 V1.5.1 (2008-12) Appendix D and the report ETSI/BRAN52d014—DFS Update, the width of a radar pulse can have any value between 0.5 µs and 30 µs. This characteristic makes impossible creating a unique table of pulse widths for radar signals. The method is also prone to frequent false detections as the width of radar pulses shorter than 2 µs cannot be measured precisely.

Another method for identifying radar pulses is presented in U.S. Pat. No. 7,702,291 and U.S. Pat. No. 7,701,382 by Hansen. The method requires selecting from the list of received signals those signals that have a "pulse width in a specified range" and counting the most frequent and the second most frequent time interval between received signals. As mentioned before, the pulse width can have any value from 0.5 to 30 µs, therefore a table with radar pulses widths cannot be created. Even more, the interval between successive signals is the same with the interval between radar pulses only in laboratory conditions. In real world, signals from various sources are interleaved with radar pulses making the interval between successive signals to have a random distribution.

In U.S. Pat. No. 7,702,044 by Nallapureddy is presented a method where a segment of the received signal is correlated with a signal generated locally. It is very similar with the well-known method used by hardware for checking the preamble of the received signal, but, instead of comparing the decoded content of the signals, this method compares the samples of the signal before being decoded. The method marks a signal lacking correlation of preamble as a possible radar pulse. As mentioned before, in an environment with heavy interference, a multitude of other signals, that are not radar signals, can have shape differing from the shape of U-NII signals. As result, this method operates on hardware and generates the same kind of information as currently used receivers. The method requires further comparing the number of received radar pulses with the number of predetermined number of pulses in a radar burst (claim 5). This operation does not improve the precision of the method, because (a) the number of pulses in a burst has a variation of at least ±2 pulses from burst to burst due to the position of the radar antenna and (b) some pulses within the burst cannot be identified if they arrive while the U-NII device is transmitting.

U.S. Pat. No. 7,599,671 by Kopicare et al. identifies radar signals as a set of pulses "where the N time intervals (between pulses) are substantially equal." In U.S. Pat. No. 7,436,352 by Theobold et al. is presented a similar idea, where the time interval between signals is used for creating a histogram. These methods cannot be used in an environment where interfering signals from other sources are interleaved with radar signals. In such cases, time intervals between successive signals have a random distribution In U.S. Pat. No. 7,593,692 by Hansen et al. is presented a radar detection method that measures the shape of the pulse. The method should allow identifying the presence of radar signals by checking a single pulse. Unfortunately, a large number of radar pulses used by weather radar installations in Europe and Asia are shorter then 1 µs and the hardware does not have enough time for collecting the number of samples required for making an accurate prediction. The method should be successful for detecting pulses with long duration as FCC Bin 5 pulses.

Steer et al. present in U.S. Pat. No. 7,647,061 a method for correlating the DFS results from one U-NII device with other U-NII devices operating in the same network. The method does not comply with currently approved certification requirements that the tested U-NII device should identify the testing signals by itself. Disregarding this inconvenience, the method fails to identify radar signals if such signals are received by only one device in the network, which is frequent when the area where the network operates has dense foliage, the terrain is very irregular or is within cities canyons.

In U.S. Pat. No. 7,436,352 and U.S. Pat. No. 7,230,566 by Theobold et al. is presented a method for identifying radar signals from the histogram of the intervals between signals. The method considers that a set of signals are from a radar source if their repetition frequency matches any of the known repetition frequency of radar pulses. The method has no applicability as radar pulses have not a-priory known repetition frequencies and in environment with heavy interference the time interval between successive signals have a random distribution.

Chiodini presents in U.S. Pat. No. 7,280,067 a method where the phase of received signal is compared with the phase of a known radar pulse for identifying that the received signal has been transmitted by a radar installation. The method is not practical because the certification requirements indicate that the pulse width and pulse repetition frequency do not have predefined values.

In U.S. Pat. No. 7,107,032 by Li is presented a method for detecting radar signals by stopping the network operation and measuring the level of energy in channel. The method is unrealistic because in real world the quiet channel does not exist. In most of the cases, the same frequency channel or adjacent channels are used by other systems that do not correlate their activity with the U-NII network.

A method for detecting radar signals from the shape of a received signal is presented in U.S. Pat. No. 7,129,884 by Tehrani. As mentioned before, the method cannot be used for measuring the shape of pulses shorter than 1 µs as hardware circuitry does not have enough time for estimating correctly the level of energy and the exact duration of the pulse.

The method presented in U.S. Pat. No. 7,155,230 by Tsien requires a radio receiver for communications and a receiver for detecting radar signals by comparing received signals with predefined radar pulses. The method is not practical, as the width and repetition frequency of radar pulses are not known a-priori.

McFarland et al. present in U.S. Pat. No. 6,697,013 a method for detecting radar signals by analyzing the frequency and power of received signals. In an environment with multiple sources of interference, radar pulses are received interleaved with other interfering signals, fact that makes the intervals between received signals to have a random distribution.

In U.S. Pat. No. 6,831,589 Shearer, III presents a device for detecting radar signals. The detection method consists in comparing the interval between received signals with the "expected pulses period." As mentioned before, the method is not applicable in real operating conditions.

The method presented in US 20100277362 by Wen detects if a radar pulse has been received during the reception of a U-NII signal. The method identifies if a radar signal is received during the reception of a data packet, when the power of the signal has a sudden increase. In fact, the method detects if during the reception of a data packet the U-NII device receives also other interfering signals. The method is applicable at hardware level and provides extra information that is useful for making an accurate detection of radar signals.

In US 20100060508 by Belcea is presented a method that allows the identification of radar signals in conditions of interference. The algorithm is of complexity $O(n^4)$ and, for execution in real time, the software has to select for processing only a small number of signals from the set reported by hardware. For this reason, false detection is frequent.

Kopikare et al. present in US 201000022213 a method for identifying radar pulses based on "substantially equal time intervals" between pulses. This method cannot identify radar pulses when the interference from other sources is so heavy that it obliterates some of radar pulses or if the interfering signals are interleaved with radar pulses.

In US 20090262004 by Wen et al. is presented a method for preventing false detection by comparing the characteristics of radar signals received by a master U-NII with the characteristics of radar signals received by a second U-NII device. The method can prevent all false detections, but it can also miss identifying true radar signals. If a real radar signal is received by only one of the two devices due to different path loss, the signals cannot be compared, as only one set of data exists.

The method presented by Wen et al. in US 20090146863 consists in sampling the signal of a data packet and estimate at least two parameters (mean and variance) characterizing the collected signal samples and comparing the two parameters with a set of predefined radar signals. The application of this method increases the amount of information provided by hardware, helping the accurate detection of radar signals with other methods.

In US 20090160696 by Pare et al. is presented a method for detecting radar signals by comparing and validating samples of received signals with one or more signal templates. The method is not practical as signal templates do not exist.

In US 20060258296 by Steer et al. is presented a circuit for detecting radar pulses by correlating samples from the same pulse (self-correlation), with the second received pulse or with predefined pulses. The method cannot properly discriminate between very short radar pulses that provide only a small number of samples and signals generated by networks operating in proximity of the host and transmitting in close frequency using FSK-TDMA modulation, for example.

Kruys et al. present in application US 20050032524 a method for detecting radar signals "by comparing said received pulse with a known characteristic." The method is not realistic, as radar signals do not have a-priori known characteristics.

Vigier et al. present in application US 20050043047 a method that takes in account inter-system and extra-system interference. The authors suggest that the operating channel should be changed when a device identifies high-level extra-system interference. The extra-system interference, which could also be from a radar installation, is analyzed for radar pulses by checking if a number of successive samples have almost the same strength and have repetitive frames. "[0021] In HiperLAN communication, the signals are transmitted with orthogonal frequency division modulation ("OFDM") on a carrier, with several (64) subcarriers, the signal transmitted (called a "burst" in the HiperLAN/2 specifications) having a minimum duration of eight microseconds, and the signals being grouped in frames of two milliseconds. Radar signals, on the other hand, consist of a repetitive series (called a "burst" in radar specifications) of pulses, the pulse width being typically less than two microseconds." This affirmation is completely inaccurate because OFDM radios can receive signals mimicking radar signals from systems using TDMA with timeframes durations within the range of radar pulses.

The entire contents of all patents, patent applications, and references cited herein are incorporate by reference.

ADVANTAGES OF THE METHOD

Low complexity: The method has two steps, each step with a complexity $O(N^2)$ where N is the number of considered elements.

Accuracy: The method takes in consideration all characteristics of the reported presumed radar pulses as the time of reception, signal strength and the duration of the signal and prevents false detections.

Not more than one false detection: The method learns about the presence of radar-like signals, records their pattern and ignores such signals if they are identified in more than one channel.

DETAILED DESCRIPTION OF THE METHOD

For better understanding the method, we should look first at signals reported by hardware, as those reports are the only source of data available to this method.

Radar installations transmit pulses continuously. The transmitted radar pulses are characterized (for the needs of this method) by Pulse Repetition Interval (PRI) or the reverse of it, Pulse Repetition Frequency (PRF), pulse power and pulse duration. Because the radar antenna rotates continuously and has a very good directivity, a U-NII device receives from radar installation pulses only when radar antenna is directed towards the U-NII receiver. When radar antenna is oriented in a different direction, the U-NII device does not receive enough energy from radar installation for reporting any pulse. The set of pulses received when the antenna is oriented towards the U-NII device is called a radar burst and the number of pulses in a burst depends on antenna rotation speed, antenna directivity and the PRI of the transmitted signal. In reverse, the radar installation can receive interfering signals from a U-NII device only when radar antenna is oriented towards the U-NII device, for as long as the duration of the radar burst.

Figure 1:
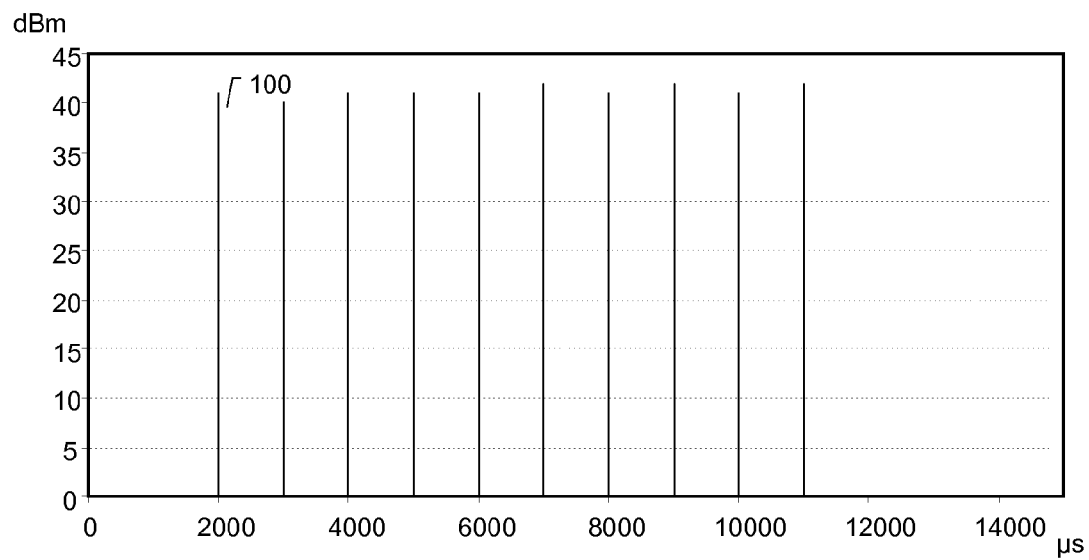
FIG. 1 presents a burst of radar pulses as it arrives at receiver.

In FIG. 1 is presented a burst of ten radar pulses (100) with a PRI=1,000 µs as they arrive at a U-NII receiver. All pulses have a height between 40 and 44 dBm (the height of a pulse is usually reported as RSSI units). This diagram represents the reported signals when the U-NII device is only listening and no other interference is present.

Figure 2:
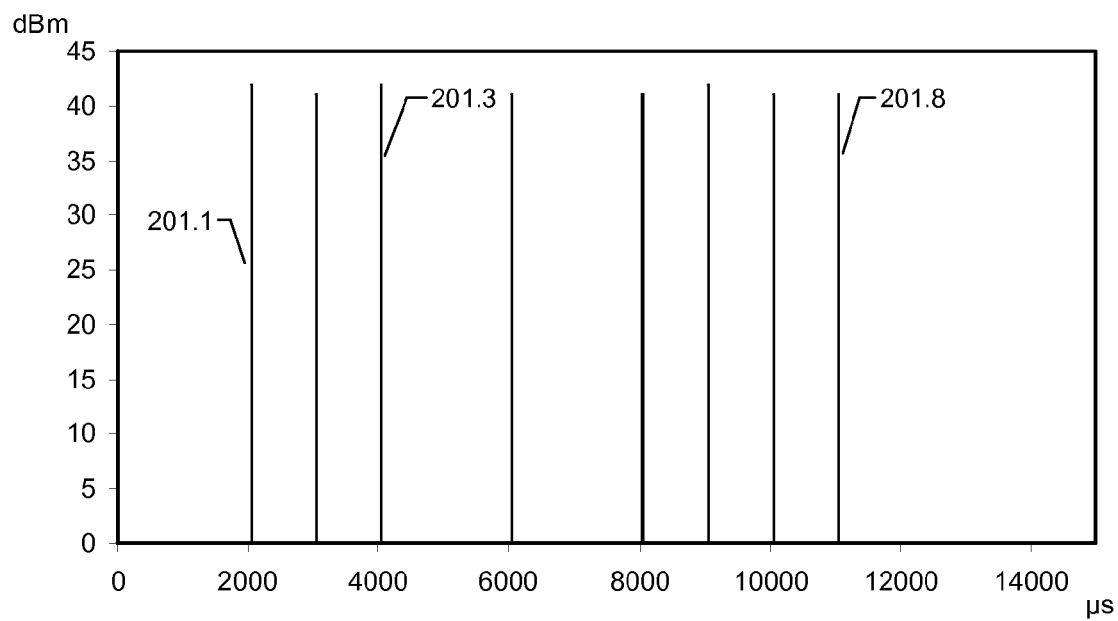
FIG. 2 presents the burst or radar pulses as reported by hardware.

U-NII devices transmit and receive in the same frequency. For this reason, the unit cannot receive while it is transmitting. It means that the device can report only those radar signals arriving at the unit while the unit is listening. If a radar signal arrives while the receiver is in process of receiving a data packet (after achieving synchronization to the signal), the radar signal may damage the correctness of received data, but it cannot be reported, as the preamble has already been detected. In FIG. 2 is presented the diagram of reported radar pulses (201.1, . . . 201.8) when the device is involved in communication with another unit. In this exemplary case (not necessary a real case), the unit transmits and receives data packets with duration 350 µs, control messages with duration of 70 µs and between any two transmissions, the unit listens for 700 µs. It can be observed that in this case two of the radar pulses cannot be reported because at the time when they arrive the unit was either transmitting or already receiving data. Depending on the amount of traffic at the receiving site and the level of interference, the number of radar pulses missing from report could be smaller or larger.

Figure 3:
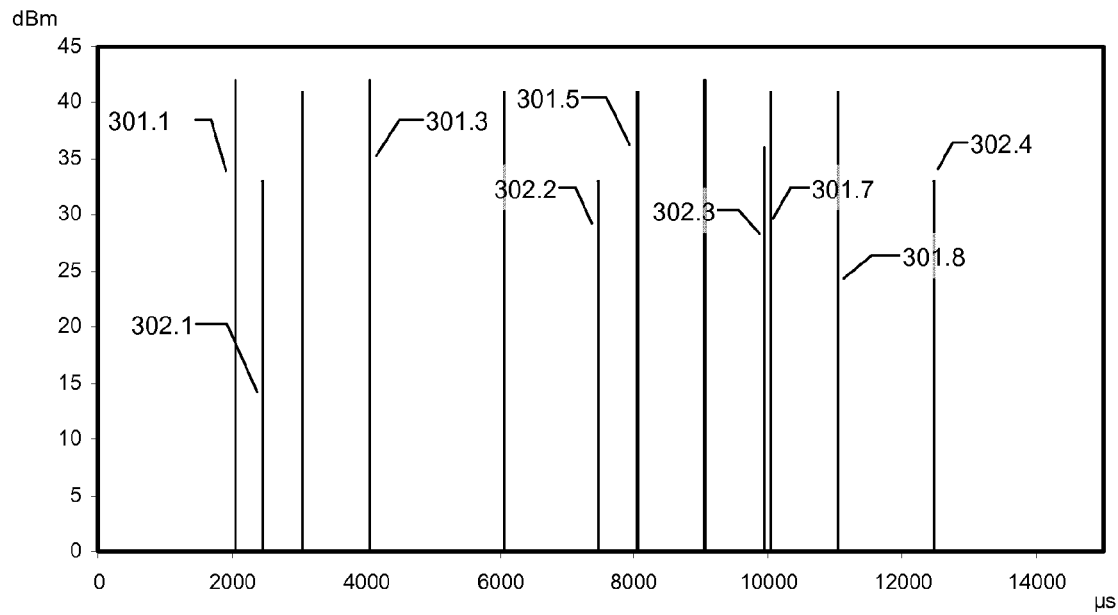
FIG. 3 shows the report of hardware when radar pulses are interleaved with interfering signals from other sources.

Finally, in FIG. 3 is presented the image of reported pulses when close to the U-NII unit operates a station using TDMA with 2.5 ms timeslot and FSK modulation in the same or close frequency channel. FIG. 3 shows all reported signals that are analyzed by software. In this example are twelve signals: eight of which are radar pulses (301.1, . . . 301.8) and four (302.1, 302.2, 302.3, and 302.4) are other interfering signals. The full set of reported pulses is presented in Table 1.

TABLE 1

| Start | Width | Height |
|---|---|---|
| 2050 | 3 | 42 |
| 2461 | 4 | 33 |
| 3050 | 3 | 41 |
| 4050 | 2 | 42 |
| 6050 | 3 | 41 |
| 7464 | 2 | 33 |
| 8050 | 2 | 41 |
| 9050 | 3 | 42 |
| 9930 | 1 | 36 |
| 10050 | 2 | 41 |
| 11050 | 2 | 41 |
| 12467 | 4 | 33 |
| 15005 | 2 | 36 |
| 17454 | 4 | 34 |
| 19954 | 1 | 33 |
| 24909 | 4 | 35 |
| 29932 | 4 | 36 |
| 32385 | 1 | 34 |
| 34835 | 1 | 36 |
| 37293 | 1 | 34 |
| 39784 | 1 | 33 |
| 42287 | 2 | 36 |
| 44788 | 2 | 34 |
| 47263 | 3 | 33 |
| 52184 | 3 | 36 |

The table shows all signals reported in a 50 ms interval. In FIGS. 1, 2, 3 and 4 are presented only those signals received in first 15 ms of the set.

In http://psychology.wikia.com/wiki/Autocorrelation can be found a very accurate definition of autocorrelation. "Autocorrelation is a mathematical tool used frequently in signal processing for analyzing functions or series of values, such as time domain signals. Informally, it is a measure of how well a signal matches a time-shifted version of itself as a function of the amount of time shift. More precisely, it is the cross-correlation of a signal with itself. Autocorrelation is useful for finding repeating patterns in a signal, such as determining the presence of a periodic signal which has been buried under noise, or identifying the missing fundamental frequency in a signal implied by its harmonic frequencies." The method for detecting radar signals compares the set of signals reported by hardware with the time-shifted image of the same set and tries to match pulses from the two sets. The matching consists in assigning to each value of the performed shift a score reflecting the level of similarities between checked pulses using a three-dimensional criterion: time of reception, signal width and signal power. The equation for setting the score S as function of shifted-time $\sigma_t$ is:

$$\Delta t = |t_i - (t_k + \sigma_t)|$$

$$\Delta w = |w_i - w_k|$$

$$\Delta h = |h_i - h_k|$$

$$S(\sigma_t) = \sum_{i=1}^{N} \begin{cases} 0 \leftrightarrow \Delta t \geq 2Et_t \vee \Delta w \geq 2Ew \vee \Delta h \geq 2Eh \\ 1 \leftrightarrow \Delta t < 2Et \wedge \Delta w < 2Ew \wedge \Delta h < 2Eh \\ 2 \leftrightarrow \Delta t < Et \wedge \Delta w < Ew \wedge \Delta h < Eh \\ 4 \leftrightarrow \Delta t < \frac{Et}{2} \wedge \Delta w < \frac{Ew}{2} \wedge \Delta h < \frac{Eh}{2} \end{cases}$$

In this equation, i is the summation index and takes all values from 1 to N, where N is the size of the set of received pulses, while k is the index in the same set where time has been shifted with $\sigma_t$. Values $t_i$ and $t_k$ are the moments when these two signals have been received. Correspondingly, $w_i$ and $w_k$ are the width (duration) of pulses i and k while $h_i$ and $h_k$ are the height (power) of those pulses.

The values Et, Ew and Eh are specific to each equipment type and settings of hardware parameters and represent the standard deviations of pulses arrival time, pulses width and pulse height as reported by hardware. Those values are computed from the variation of reported characteristics for radar-like pulses generated with a signal generator in lab. If the equipment presents large variations of the values of standard deviations as function of signal duration or signal power, it may be necessary to generate sets of standard deviations of parameters for various ranges of signal width and signal power. If any parameter of the receiver configuration is changed, a new set of standard deviations should be measured.

Figure 4:
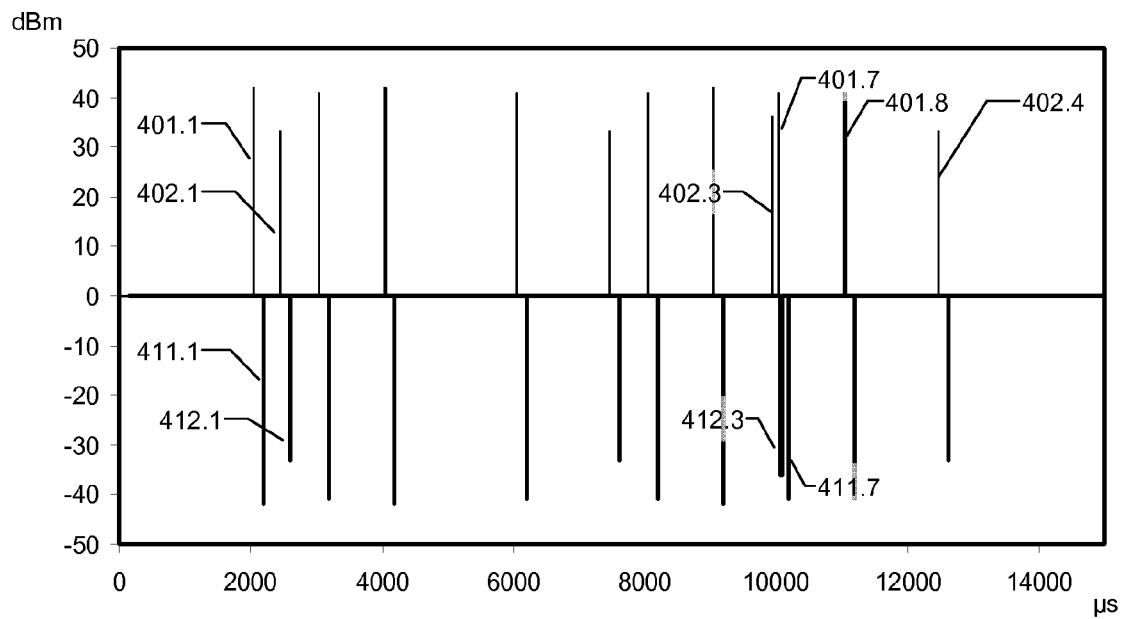
FIG. 4 shows the set of reported pulses compared with the same set shifted in time.

In FIG. 4 is presented the reported set of signals and, with negative values for signal strength (for presentation purposes), is presented the same set shifted with 120 µs. The method requires to compare signal 401.1 with 411.1, 411.1 with 402.1, 402.1 width 412.1 and so on. Each compare should return a score of 0, 1, 2, or 4, that are added as the score of a presumed radar pulse with a presumed PRI of 120 µs.

Supposing that Et is 5 µs, for example, in situation presented in FIG. 4 only one compare generates a score larger than zero. Since the time shift is 120 µs, which is also the interval between signals 301.7 and 302.3, the time of signal 401.7 and the shifted time of signal 412.3 are the same. As result, the score S(25) will be established based on the difference of duration and power between these two signals.

Figure 5:
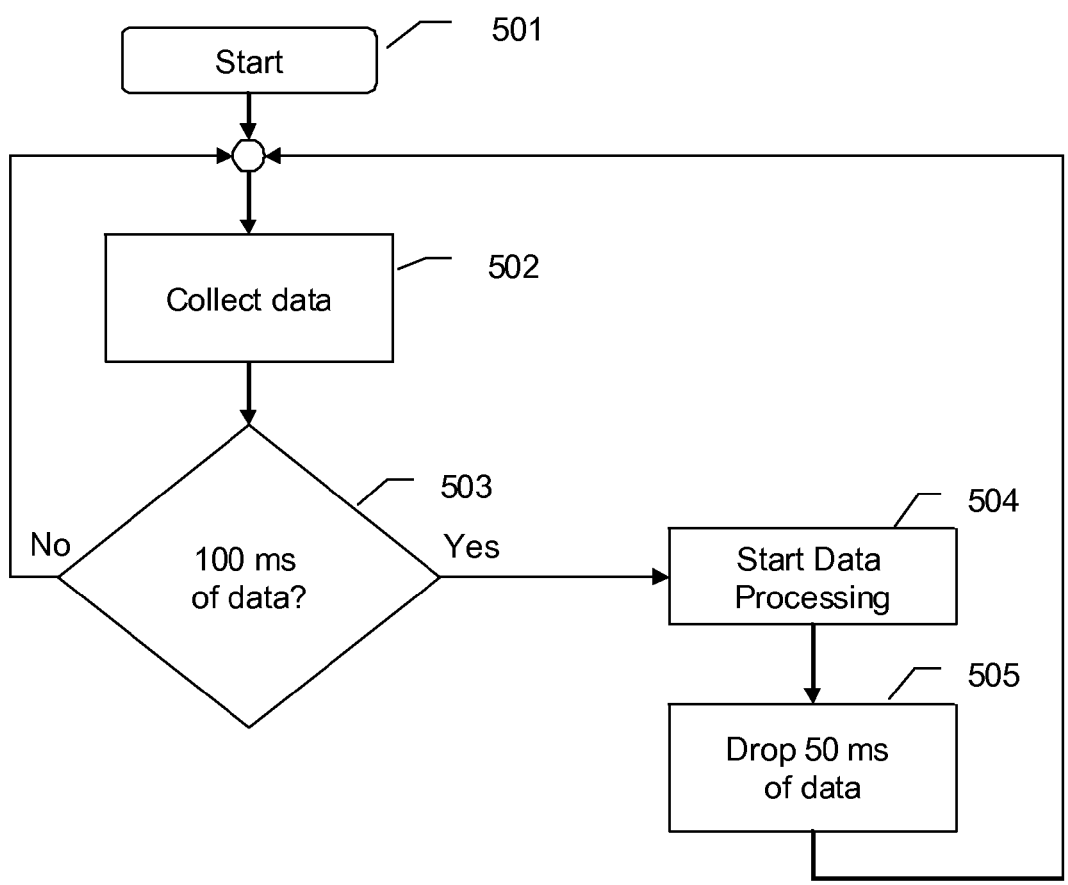
FIG. 5 shows the general flowchart of the method.

The top-level view of the method is presented in FIG. 5. The method requires collecting data reported by hardware in step 502. When the collection has more than 100 ms of data (step 503), the processing of data starts in step 504. Once the processing is completed, the oldest 50 ms of data is discarded in step 505 and the collection of new data is continued. The value of 100 ms is used here as an example. It can be changed to any value that will not cause delays for changing channels outside of legal requirements.

Figure 6:
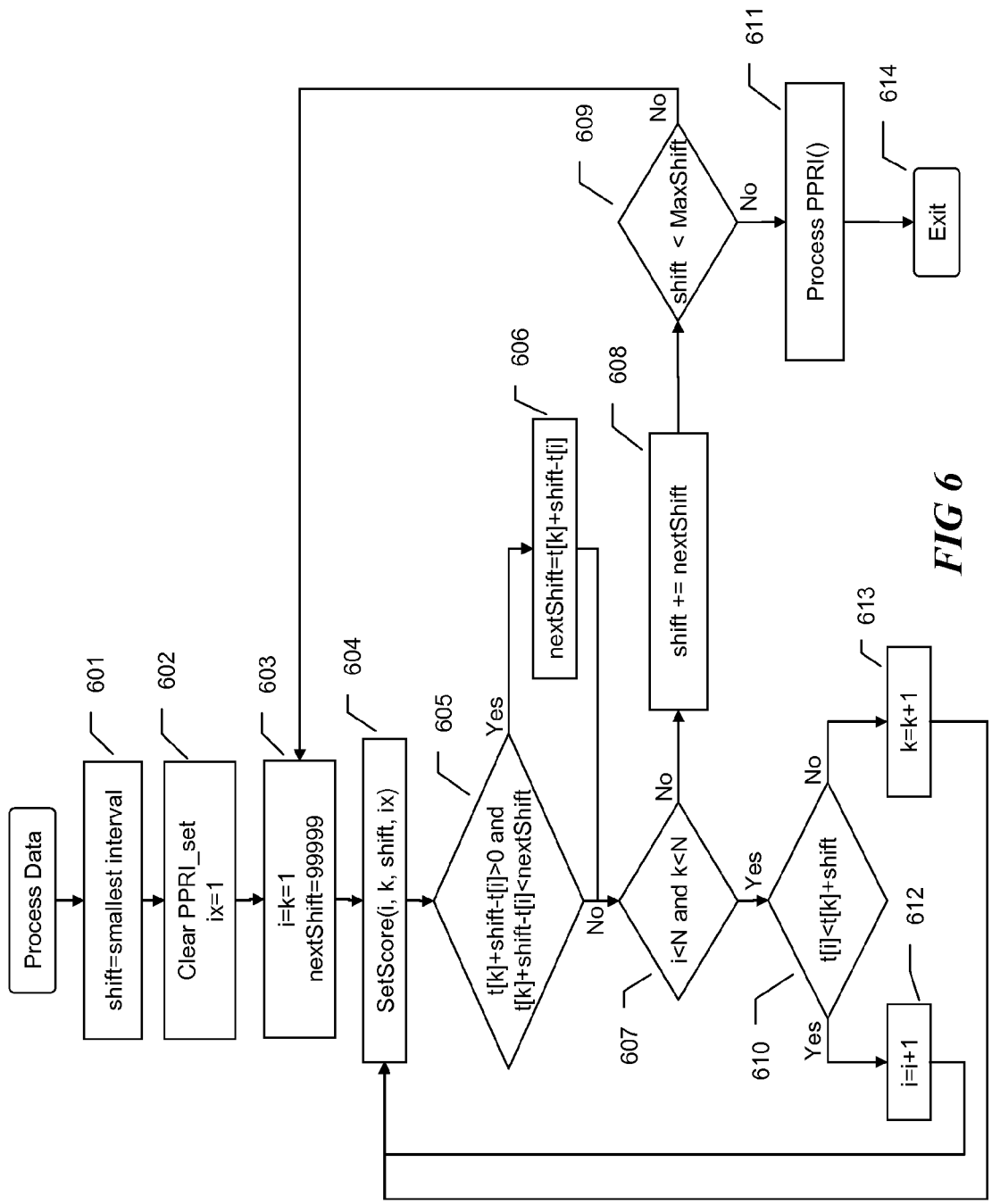
FIG. 6 presents the main procedure for processing collected data.

In FIG. 6 is presented the data processing procedure. In step 601 is identified the smallest interval between two successive signals within the set of collected signals. In the exemplary case, those signals are 302.3 and 301.7 and the smallest shift is 120 µs. Optional, if the first shift is smaller than the smallest known radar PRI, the first shift value can be set to the smallest possible radar PRI. The PPRI_set will contain the collection of presumed PRI. Each presumed repetition interval PPRI is an element characterized by the interval of shift values and the weighted average of power and duration. The concept is a little complicated and will be clarified along the description of the method.

In step 602 the size of PPRI_set is set to zero (empty set) and the index ix in this set is set to 1. In step 603 are set the initial value of nextShift, the index i used for parsing the original set of signals and index k used for parsing the time-shifted set of signals. In step 604 the procedure SetScore is activated for checking and eventually setting the score according with the matching between pulse i and k according with the current time-shift denoted by shift. If the matching process generates a presumed PRI with score larger than zero, it is recorded in PPRI_set in position ix. The procedure for checking and setting the score is presented in detail in FIG. 7. In step 605 and 606 is identified the value of nextShift that will be used as the increment for the next time-shift. If both i and k are smaller than N, the method performs step 610. In this step the recorded time of signal i is compared with the shifted time of signal k. If the first is smaller, index i is increased by one (step 612); otherwise the value of k is increased by one (step 613). If either one of i or k is not smaller than N (step 607), the shift is increased with the identified value nextShift in step 608. If the new value of the shift is smaller than the preset threshold MaxShift, the method continues with step 603. If the value of shift is larger than the threshold, the searching process is completed and the method continues with step 611 processing the collected set of PPRI. The threshold MaxShift is set to three-four times the value of the largest radar PRI. After the processing of PPRI is completed, the procedure exits in step 614.

Figure 7:
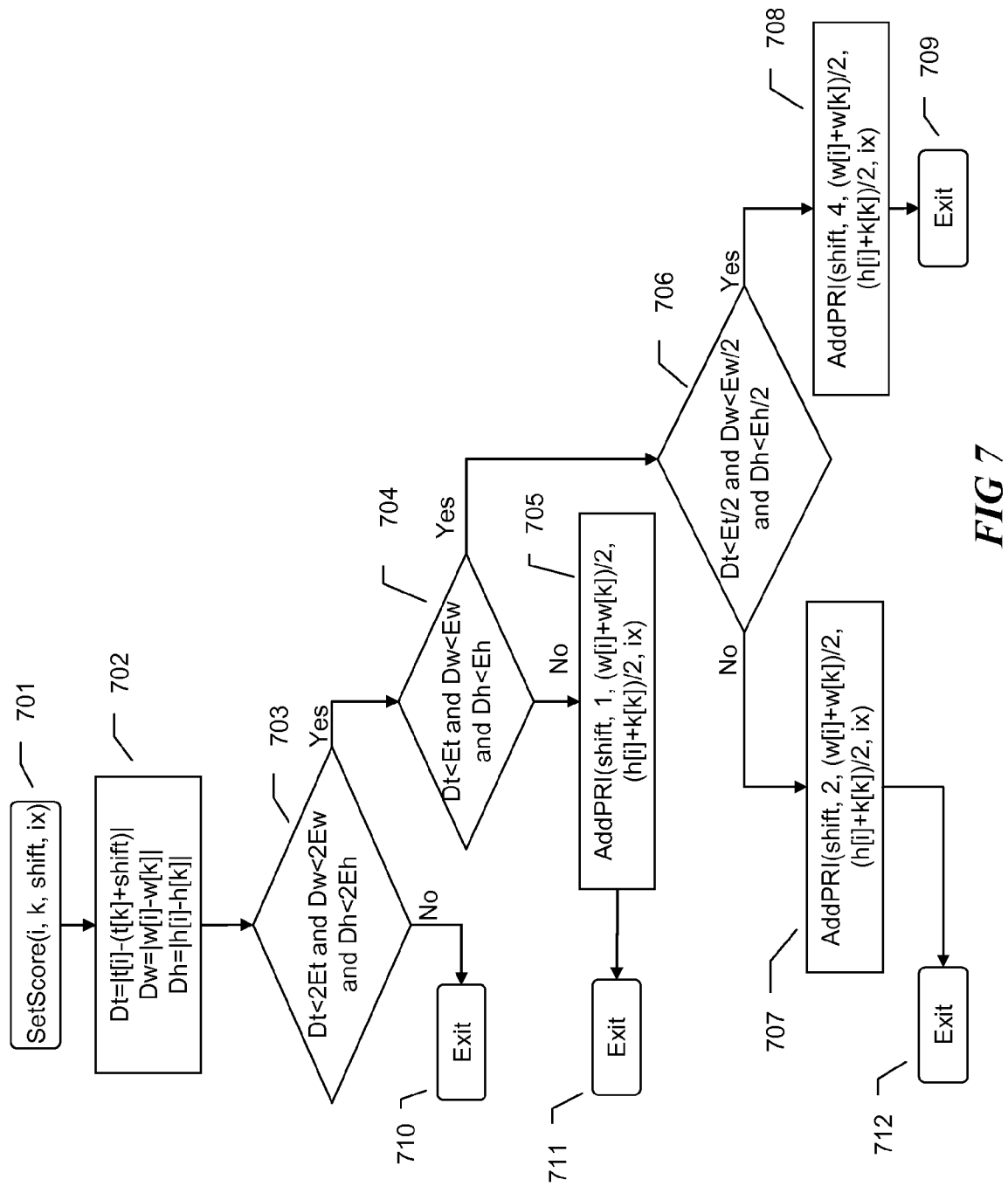
FIG. 7 shows the flowchart of the function associating a score to each Probable Pulse repetition interval (PRI).

In FIG. 7 is presented the procedure for computing the score for the current shift by comparing signal i with the shifted signal k. In step 702 the method computes the differences between these two signals in time (Dt), in width (Dw) and in height (Dh) as absolute values. In step 703, these three differences are compared with two standard deviations of radar signals. As previously described Et, Ew and Eh are identified from laboratory measurements and represent the standard deviation of radar signals as reported time, signal duration and signal strength. If any of these three differences is larger than two standard deviations, the current shift cannot be considered as a PRI and the procedure exits at step 710. In step 704 the same three differences are checked against one standard deviation of the three characteristics of the two signals. If at least one difference is larger than one standard deviation, the shift is recorded in PPRI_set with value shift, weight 1 and the average values of the width and height of signals i and k. If all differences are smaller than the half of corresponding standard deviation, the shift is recorded in PPRI_set with weight 4 in step 708. Otherwise, if at least one difference is larger than the half of corresponding standard deviation, the shift is recorded in PPRI_set with weight 2 in step 707. In any case, the width and height of the considered PPRI is the average of the width and height of signals i and k.

Figure 8:
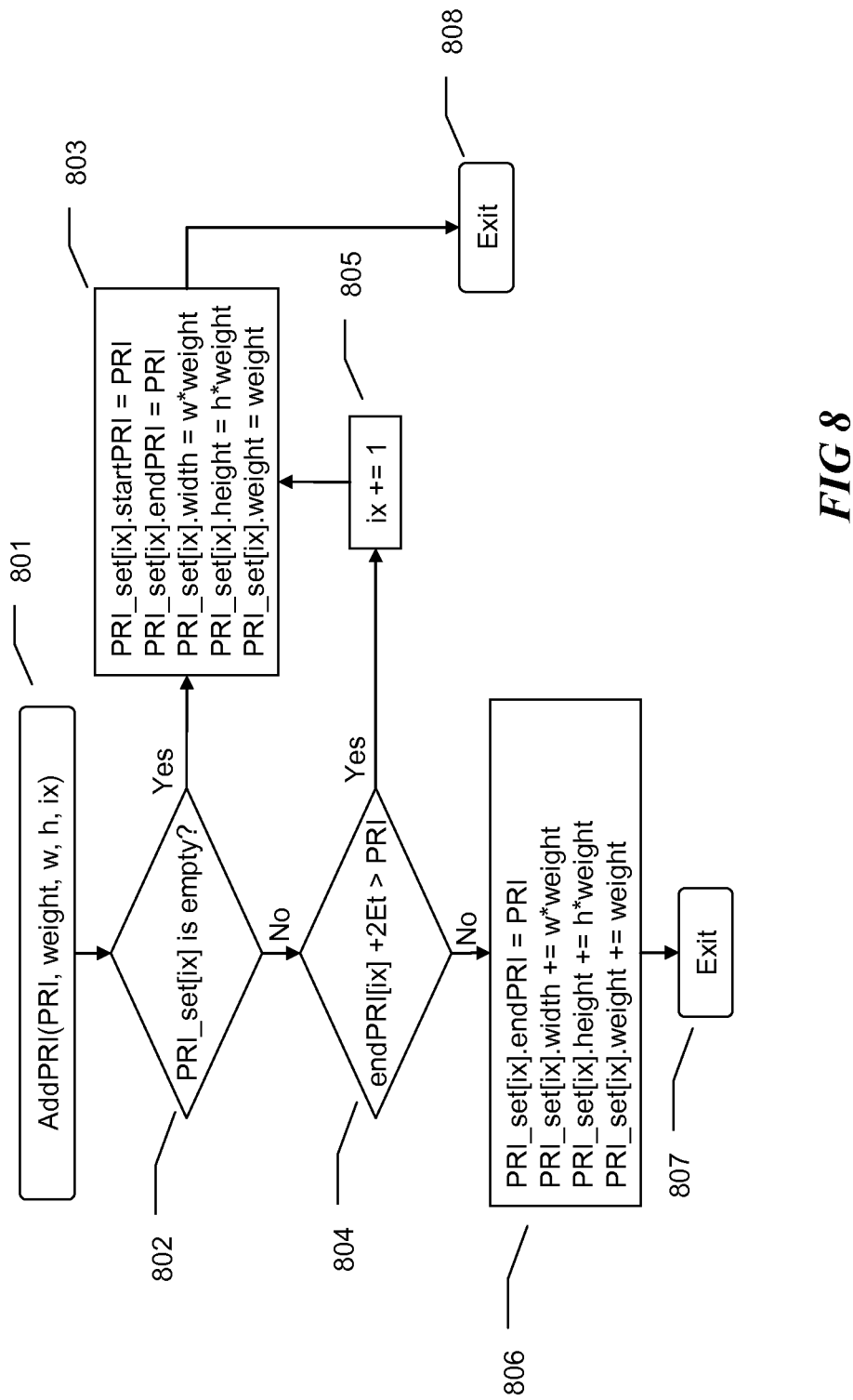
FIG. 8 shows the procedure for appending a new value to the set of identified PPRI.

The procedure for recording a shift in PPRI_set is presented in FIG. 8. The procedure has as parameters the value of the shift as formal parameter PRI, the weight of the check, the average width w, the average height h and the index ix of the last recorded element in the PRI_set. In step 802 is verified if the element with index ix exists. If it does not exist (the set is empty) a new entry is created and initial values are stored in step 803. Each element in PPRI_set is associated to a cluster of shifts. The startPRI and endPRI are the smallest and the largest values of time-shifts considered as members of the same cluster. When a new item is created, these two values are identical. The width and height of the new item are set to the product between the weight and the w and h in step 803. If the element with index ix already exists, it is checked if the new of PRI (that is the current shift) is within two standard deviations Et from the endPRI of the last element in the PPRI_set. If it is closer than 2Et, the endPRI is changed to the new PRI and the width, height and weight are increased in step 806. If in step 804 is identified that the new PRI is more than 2 standard deviations in time from the end of the cluster endPRI, the index ix is increased by one in step 805 and a new element is created in step 803. The procedure exits in step 808 after creating a new element or in step 807 after updating an existing element.

An example of the result of this method is presented in Table 2 in columns Start-Time, EndTime and count. The rest of the columns are computed in next steps of the method. In this table, the columns for width and height are omitted as are not important for understanding the method.

TABLE 2

| No. | StartTime | EndTime | Count | Median | Score | Root |
|---|---|---|---|---|---|---|
| 1 | 1000 | 1000 | 35 | 1000 | 291 | |
| 2 | 2000 | 2000 | 35 | 2000 | | 1 |
| 3 | 2449 | 2458 | 33 | 2454 | 45 | |
| 4 | 2475 | 2475 | 8 | 2475 | | |
| 5 | 2491 | 2491 | 9 | 2491 | | |
| 6 | 2500 | 2503 | 17 | 2502 | | |
| 7 | 3000 | 3000 | 21 | 3000 | | 1 |
| 8 | 4000 | 4000 | 21 | 4000 | | 1 |
| 9 | 4903 | 4908 | 12 | 4906 | | 3 |
| 10 | 4987 | 4994 | 18 | 4991 | | 1 |

Figure 9:
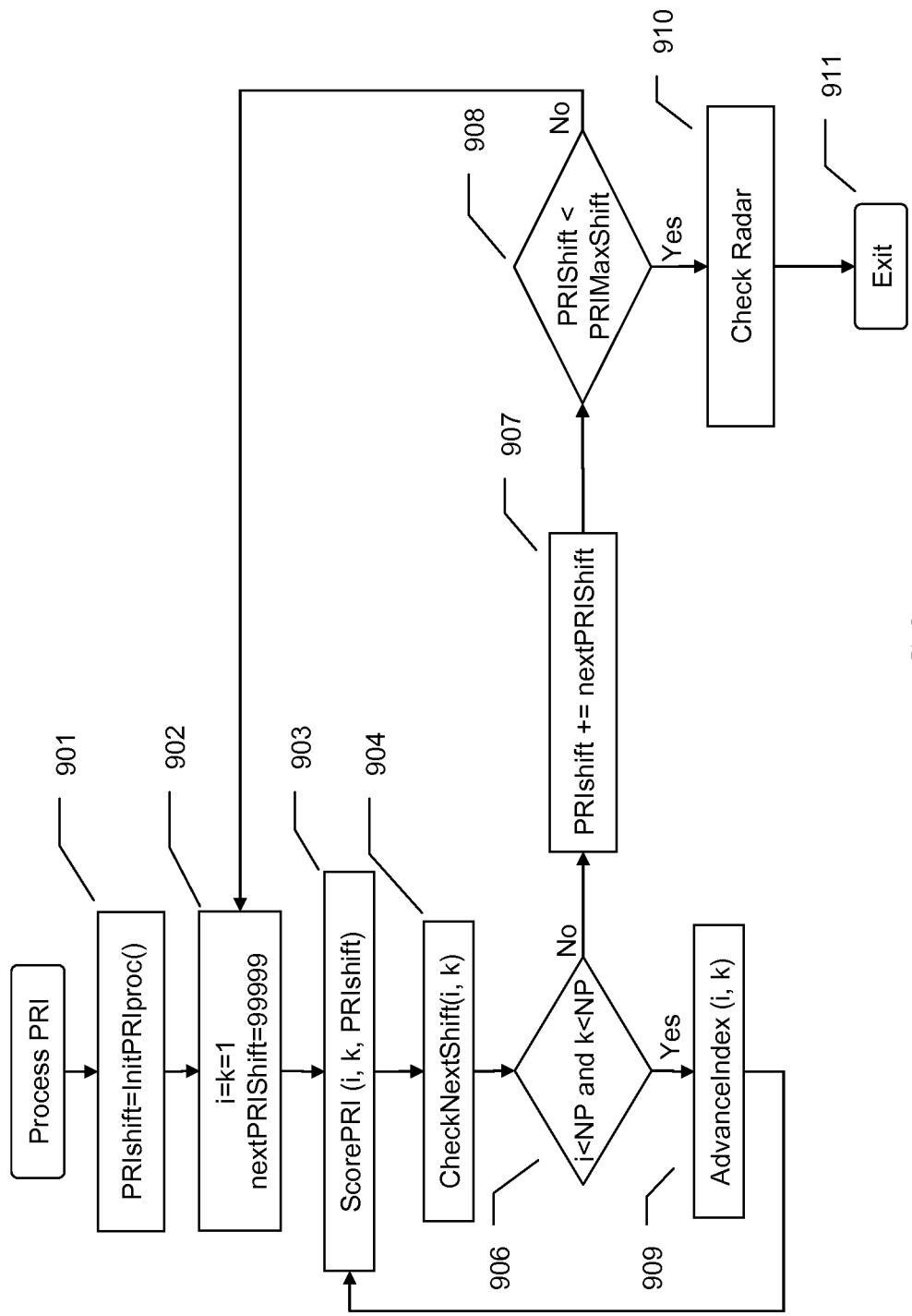
FIG. 9 shows the flowchart of the procedure for checking the validity of each PPRI.

The procedure for finding if any element in PPRI_set can be associated to a radar installation is presented in FIG. 9. The procedure is first initiated in step 901 and the current value of the shift PRIshift is set. In step 902 is initiated the searching loop. Elements in PRI_set with index i and k are checked in step 903 by calling the scoring procedure. In step 904 is updated the value of nextShift which will be used as increment to PRI_shift in step 907. If both i and k are smaller than the size of PPRI_set (step 906), only one of the i or k is increased in step 909. If at least one of them is as big as the size NP of the PPRI_set, the PRIshift is increased with the nextShift value in step 907. If PRIshift is not larger than a maximum value PRIMaxShift (step 908), the procedure continues with step 902. If PRIshift is larger than the threshold, the existence of radar PRI is checked in step 910 and the procedure exits in step 911.

Figure 10:
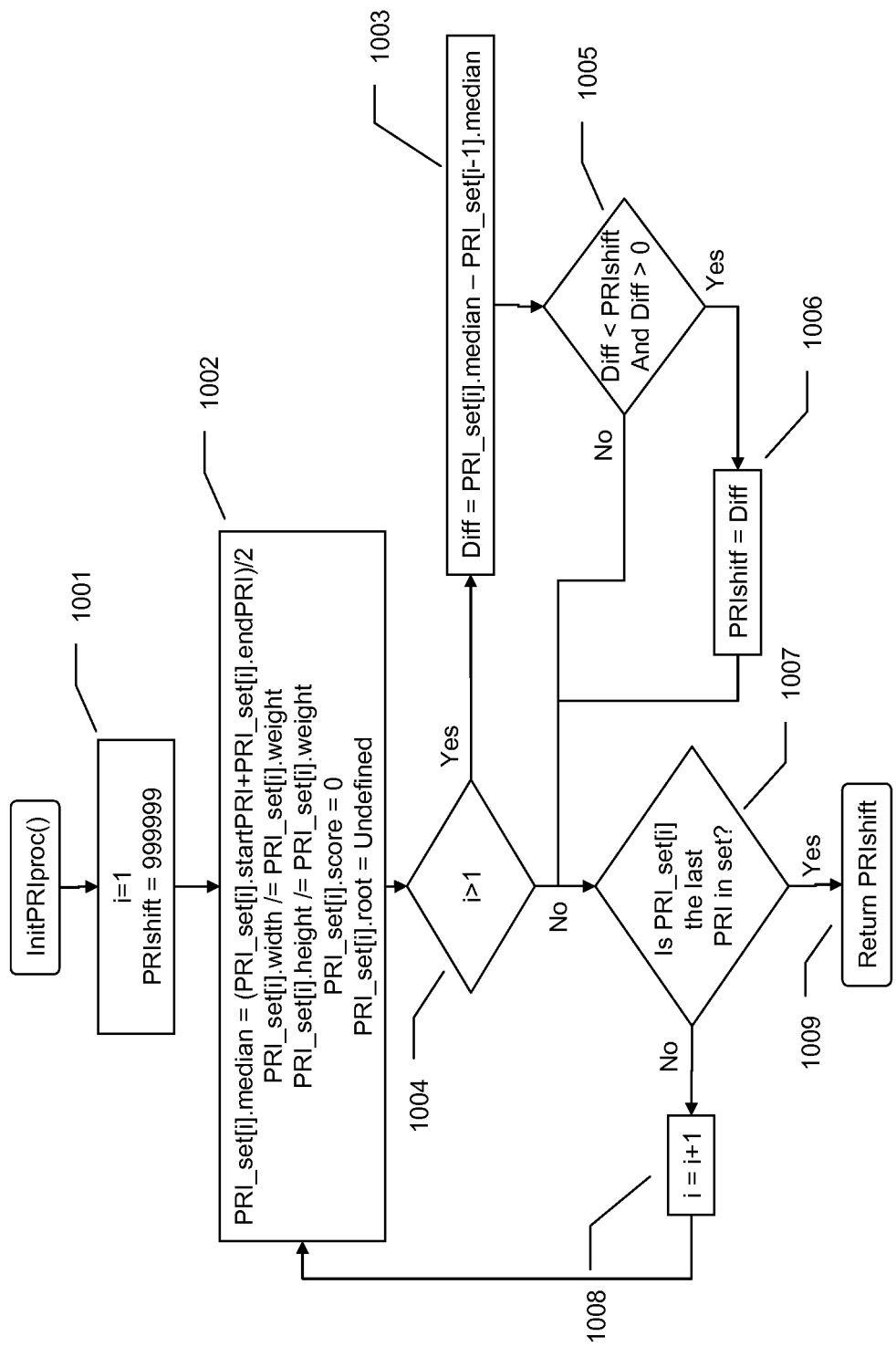
FIG. 10 shows the flowchart of the procedure for initiating the validity checking of PPRI.

In FIG. 10 is described the procedure for initializing the processing of PPRI called at step 901. This procedure computes the median value of each PPRI interval (from start to end), sets the score of all elements in PPRI_set to zero, sets all roots to Undefined and computes the weighted average of width and height for each element in PPRI_set in step 1002. The initial time-shift PRIshift, that is the smallest time interval between median values of two successive elements in PPRI_set is identified in steps 1003, 1005 and 1006 when i is larger than one (step 1004). If the element i is not the last in the PRI_set (step 1007), the value of i is increased by one and the operation continues with step 1002. The procedure returns (step 1009) the value of PRIshift that will be used as the first shift for checking if PPRI_set contains any radar PRI. As previously mentioned, in another embodiment of this invention, the value of PRIshift can be also restricted to values not smaller than the shortest PRI of weather radars operating in deployment region.

Figure 11:
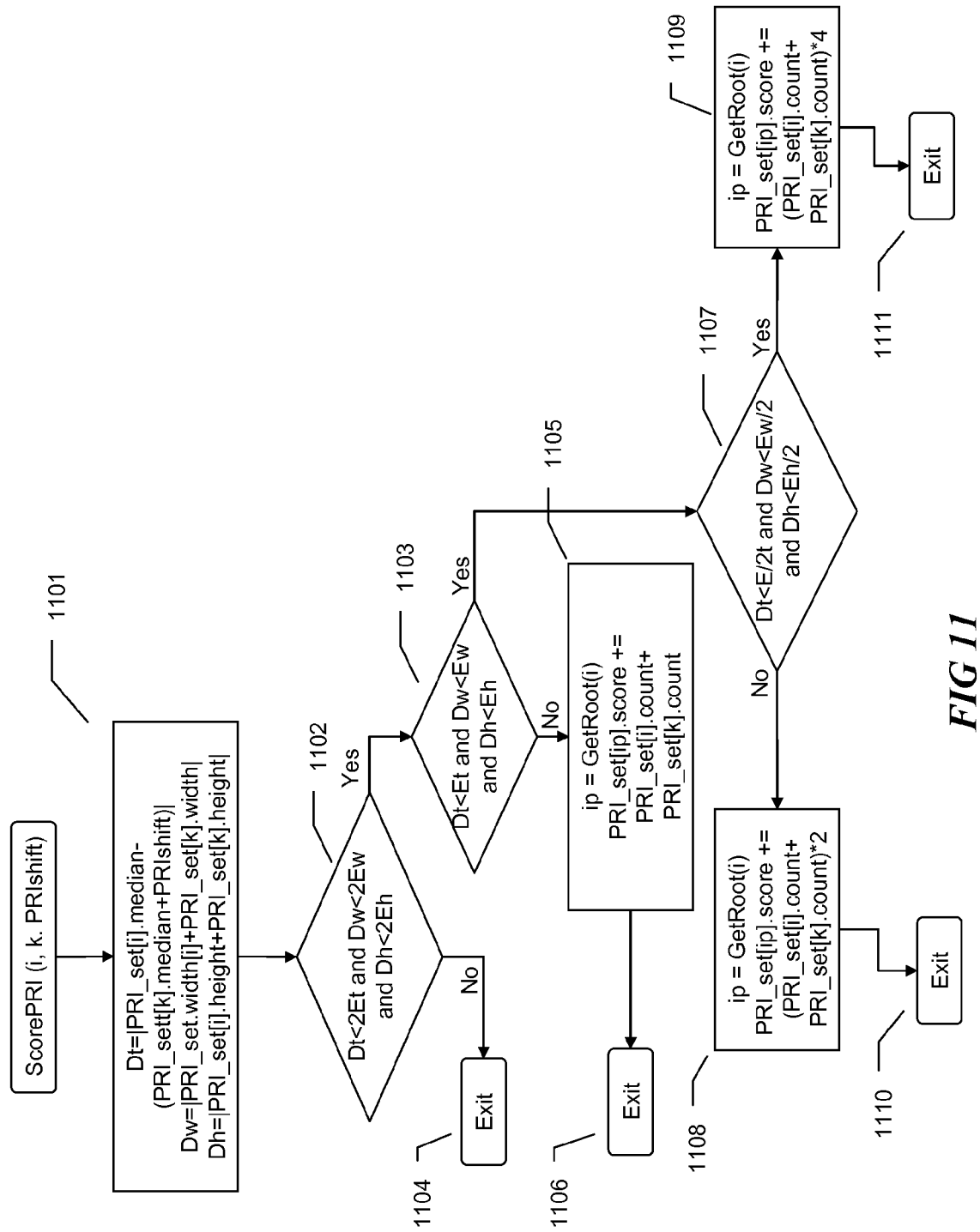
FIG. 11 shows the flowchart of the procedure scoring PPRI according with relative differences between a PPRI characteristics and time-shifted image of the same set.

The function for setting the score of each element in PPRI_set is described in FIG. 11. In step 1101, the method computes Dt, the absolute value of differences between the median values, between the width and the height of element i and k as Dt, Dw and Dh. In step 1102 the differences are checked against the known values of standard deviation of time, width and height for radar signals measured in laboratory, values that are specific to equipment and equipment settings. If any of those three differences is larger than twice the value of corresponding standard deviation, the procedure exits in step 1104 without recording any score. If all values are smaller than twice the standard deviation of measurement errors, the same three values are checked in step 1103 against the corresponding standard deviations and in step 1107 against half of standard deviations. Depending on the precision of matching, the score of the root of element i is increased with the value of count of elements i and k multiplied with a weighting factor of 1, 2 or 4 (steps 1105, 1108 or 1109) according with the precision of matching. After recording the score, the procedure exits on step 1106, 1110 or 1111.

The score of the autocorrelation between elements of PRI_set is computed with the function $$\Delta t = |t_i - (t_k + \sigma_t)|$$
$$\Delta w = |w_i - w_k|$$
$$\Delta h = |h_i - h_k|$$

$$S(\sigma_t) = \sum_{i=1}^{N} \begin{cases} 0 \leftrightarrow \Delta t \geq 2Et \vee \Delta w \geq 2Et \vee \Delta h \geq 2Eh \\ 1 \leftrightarrow \Delta t < 2Et \wedge \Delta w < 2Ew \wedge \Delta h < 2Eh \\ 2 \leftrightarrow \Delta t < Et \wedge \Delta w < Ew \wedge \Delta h < Eh \\ 4 \leftrightarrow \Delta t < \frac{Et}{2} \wedge \Delta w < \frac{Ew}{2} \wedge \Delta h < \frac{Eh}{2} \end{cases}$$

or another scoring function. In Table 2, the column Score contains the score computed with this method for the exemplary case.

Figure 12:
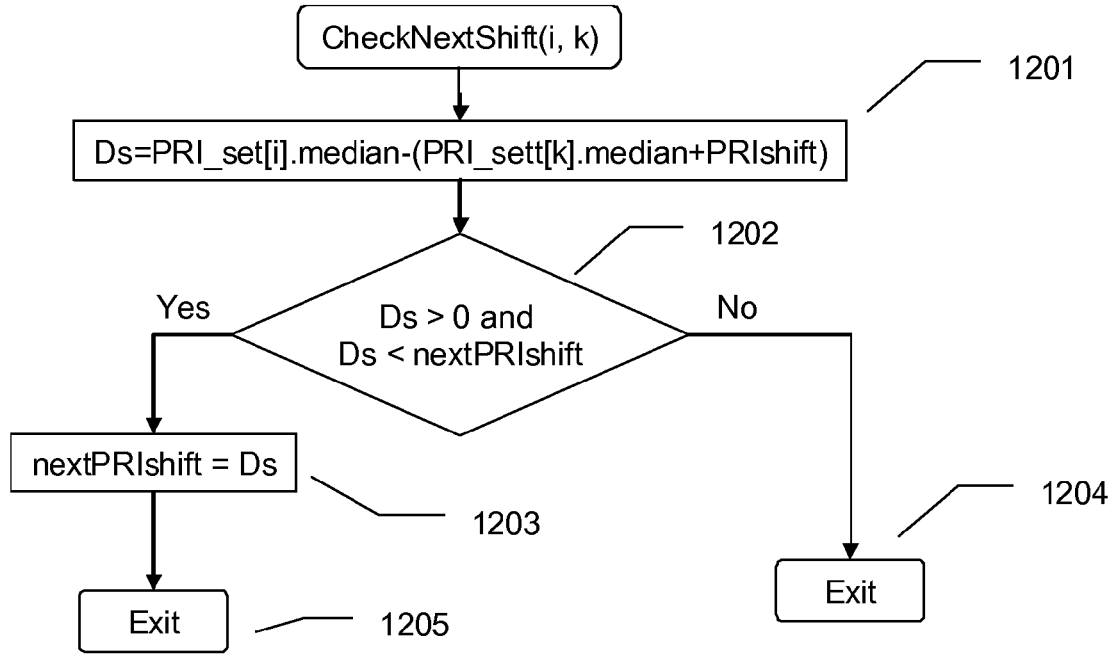
FIG. 12 presents the procedure for finding next time-shift for checking PPRI validity In FIG. 13 is presented the method for indices management in initial PPRI set.

In FIG. 12 is presented the procedure for selecting the increment for the shift used in next loop. In step 1201 is computed Ds, the difference between the median value of element i and of shifted image of element k. If the value of Ds is positive and smaller than previously identified nextPRIshift (step 1202), Ds is considered as a better choice for nextPRIshift in step 1203. The procedure exits in step 1205 after selecting a new nextPRIshift or in step 1204 if nextPRIshift remains unchanged.

Figure 13:
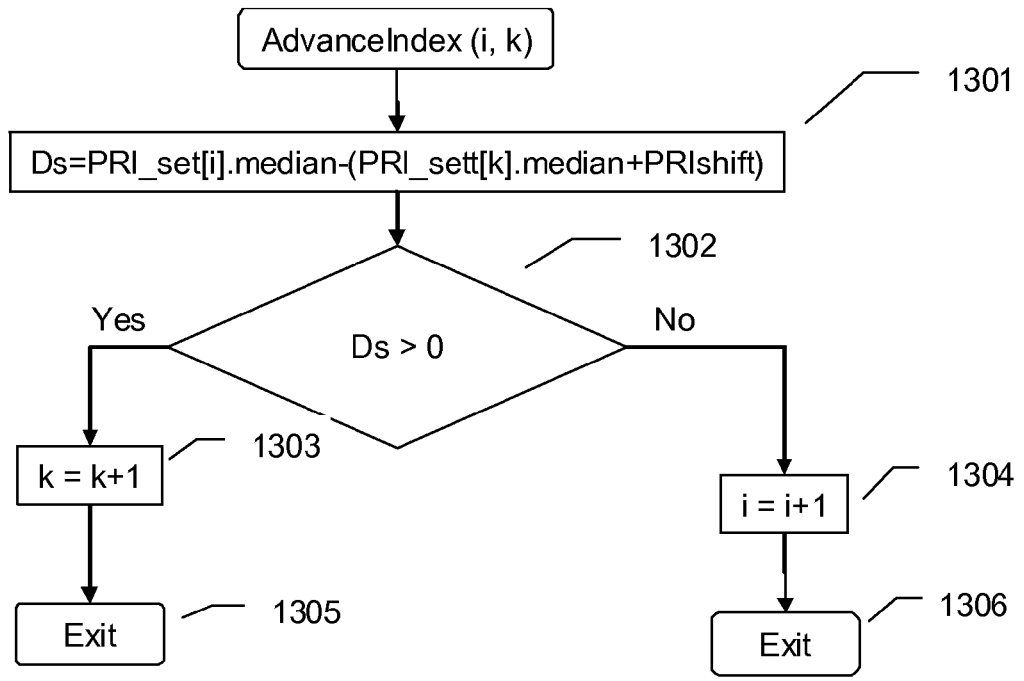

In FIG. 13 is presented the procedure used for increasing the index in the PPRI_set during the autocorrelation. In step 1301 is computed the value Ds that is the difference between the median value of element i and of shifted median value element k. If Ds is positive (step 1302), the value of index k is increased by one in step 1303 and procedure exits in step 1305. If Ds is not positive, the index i is increased in step 1304 and procedure exits in step 1306.

Figure 14:
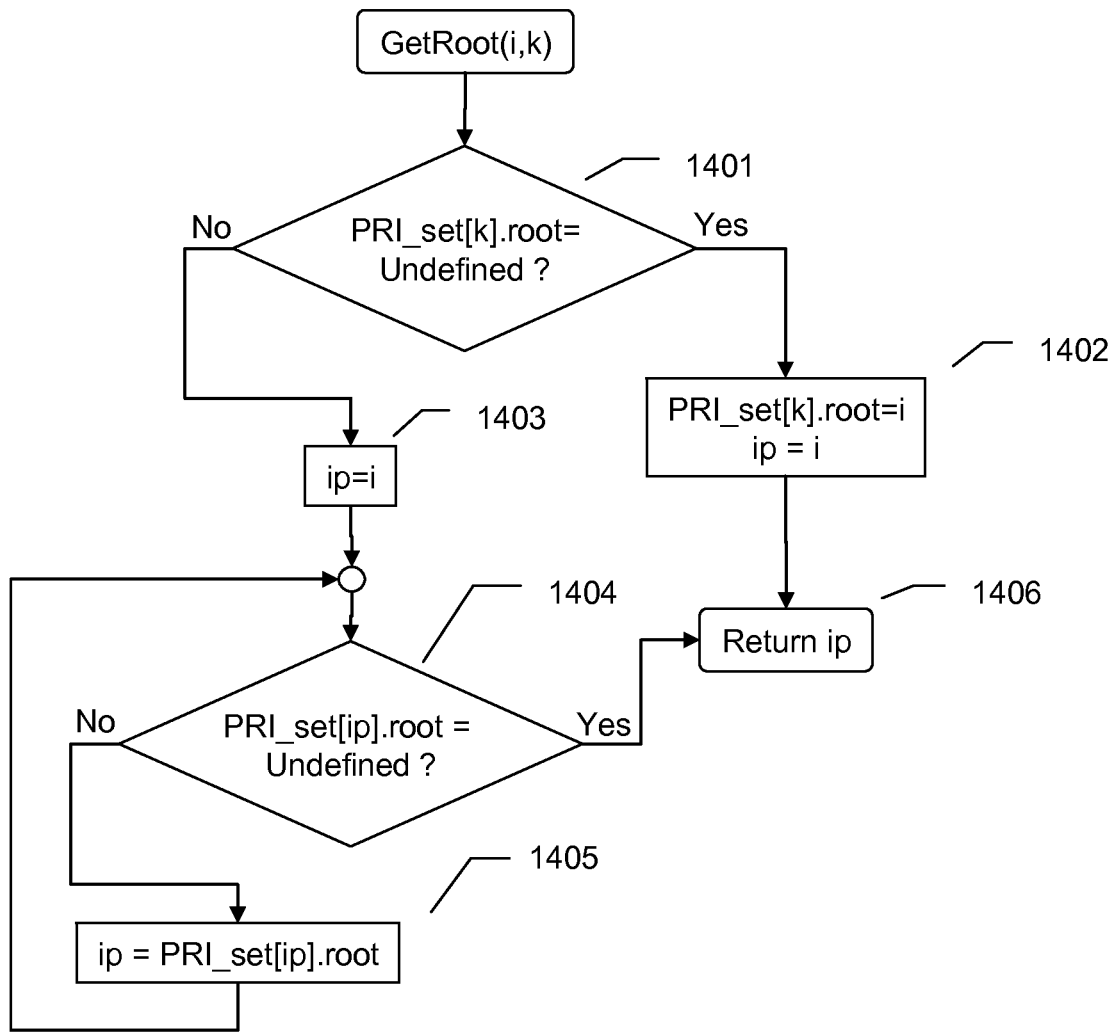
In FIG. 14 is presented the procedure for discriminating between true radar signals and radar-like signals.

The procedure for finding the root of an element in PPRI_set is presented in FIG. 14. The PRI_set contains information about presumed PRI identified from the analysis of reported signals. Those skilled in the art will identify that if a subset of signals were generated by a radar installation, the algorithm will identify as presumed elements of PPRI_set those elements with the median values the same as the radar signal PRI along with elements that have the median value as a multiple of radar PRI. The element with the smallest median value is called the root of the class while those elements with median values multiple of root median value are the leaves of the class. This procedure has as scope to set the precedence in the class as index values in field root. The procedure starts by checking in step 1401 if element k has a defined root, therefore if it is already a member of a class. If the field root has undefined value, it is changed to the current value of index i the and the procedure exits on step 1406. If element k has the field root set to a defined value, the index of the parent ip is set to i in step 1403. In steps 1404 and 1405 the linked list is parsed until the last element (the root) is found. Those skilled in the art will easily identify that all roots in the PRI_set have the field root=Undefined and all elements in the class have repetition intervals as multiple of the root repetition interval. The index of the root ip is returned in step 1406.

Figure 15:
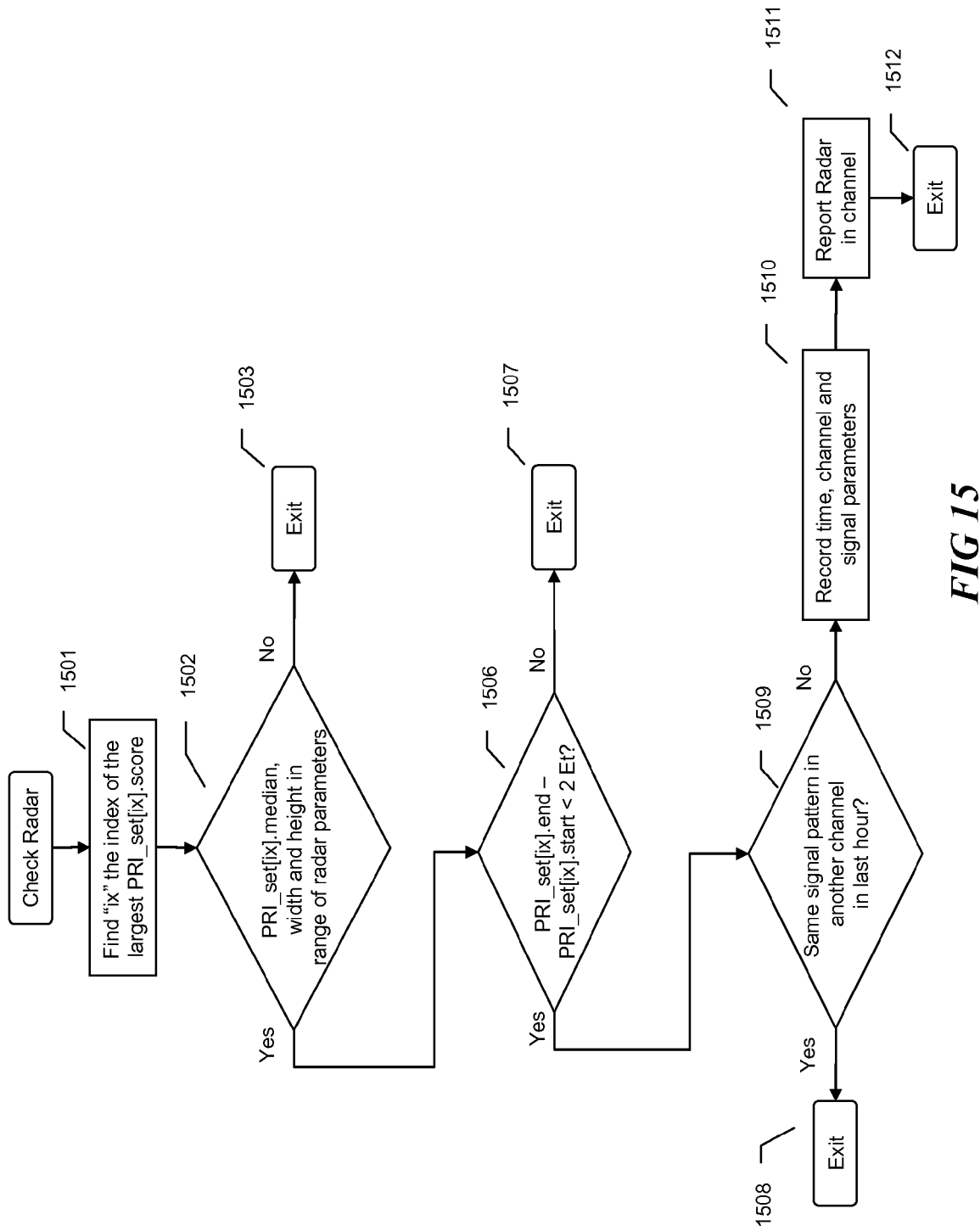
FIG. 15 shows the flowchart for confirming that the identified signal is a true radar signal.

In FIG. 15 is presented the function for deciding if any element in PRI_set is associated with a burst of radar signals or it is just periodic interference from another source. In step 1501 the method identifies the index of the element with the highest score. In step 1502 are verified the parameters of this element. The median should be in the range of known radar PRI vales, the width should be within the range of widths expected for radar pulses and the height should correspond with the signal level required by legislation. If one of these conditions is not verified, the element median value is not the PRI of a radar installation and the procedure exits at step 1503. If the parameters are within expected ranges, the difference between the end and the start of the PPRI is compared with 2 Et in step 1506. If the difference is larger than 2 Et, the procedure exits at step 1507. If the difference is smaller than 2 Et, there is a very high probability that the median value of the identified element is a radar PRI. In this case, the signal characteristics (PRI, height and width) are checked against previously encountered radar signals. If the same signal was received in near past in another channel, the signal could be from a radio using similar signals as radar installations. If no signal with identical characteristics has been identified recently in a different channel, there is a very high probability that the signal was generated by radar installation. In this case, the time, channel frequency and signal characteristics are recorded in step 1510. The existence of radar pulses in channel is signaled to other layers of the system for performing the procedures for channel change.

As it can be seen in Table 2, the first element in the list is the root of another 4 elements and has the highest score. The median is 1000 μs, which corresponds with the known radar PRI. The algorithm reveals several elements with median values between 2449 μs and 2500 μs corresponding to transmissions from TDMA station.

In another embodiment, the number of elements in PPRI_set can be reduced by eliminating from computation those elements that have the count smaller or larger than thresholds.

CITED REFERENCES

1. ETSI EN 301 893 V1.5.1 (2008-12) Broadband Radio Access Networks (BRAN); 5 GHz high performance RLAN; Harmonized EN covering the essential requirements of article 3.2 of the R&TTE Directive
2. ETSI/BRAN52d014 DFS Update: European Weather Radars—Details & Overview at *European Telecommunications Standards Institute BRAN#52* 8—11 Oct. 2007 *Sophia-Antipolis*
3. FCC 06-96 Revision of Parts 2 and 15 of the Commission's Rules to Permit Unlicensed National Information Infrastructure (U-NII) devices in the 5 GHz band Docket No. 03-122/Jun. 30, 2006
4. FCC CFR Title 47 Part 15.407
5. http://psychology.wikia.com/wiki/Autocorrelation

The invention claimed is:
1. A method for detecting radar signals by wireless communication devices comprising:

operating the device for reporting the reception of radio signals identified as bursts of energy that are not caused by the transmission of data packets by other devices operating in the same wireless communication network;

identifying a set of Probable Pulse Repetition Intervals and ranking each element of the set using a scoring function;

identifying if the set of Probable Pulse Repetition Intervals contains elements with time of arrival and duration differing with less than two standard deviations from signals generated by radar installations;

generating requests for changing the operating frequency if radar pulses are identified and signals with the same PRI, duration and power have not been received in a different frequency channel.

2. The method of claim 1, wherein the report regarding the received signals contains the frequency channel where the signals have been received, the time of the reception of the signal, the duration of the signal and the power of the signal.

3. The method of claim 1, wherein the Probable Pulse Repetition Intervals are the values of the time-shift used in an autocorrelation that associates to each Probable Pulse Repetition Interval a matching score computed with a score generating function.

4. The method of claim 3, wherein from the set of Probable Pulse Repetition Intervals are selected for further analysis only those elements that have a score larger than a predefined threshold.

5. The identification of elements in the set of Probable Pulse Repetition Intervals with radar like characteristics of claim 1 further comprising the following steps:

splitting the set of Probable Pulse Repetition Intervals in classes where each class is a subset of Probable Pulse Repetition Intervals with the values of repetition intervals equal to arithmetical multiples of at least one Probable Pulse Repetition Interval of the same class;

using an autocorrelation operation with shifted repetition interval which associate to each class of Probable Pulse Repetition Intervals a score according with a score generating function;

eliminating those classes with score smaller than a predefined threshold; and further eliminating those Radar Pulse Repetition Intervals that have the repetition interval and the duration differing from the same elements of any known radar signal with more than 2 standard deviations.

6. The method of claim 1, wherein the channel number or signal reception frequency, Pulse Repetition Interval, signal duration and signal power of identified radar Pulse Repetition Intervals are stored for further reference.

7. The method of claim 1, wherein some of the identified radar Pulse Repetition Intervals are rejected as coming from radar installations if signals with the same Pulse Repetition Intervals, duration and power have been received in a different channel.

* * * * *